(12) United States Patent
Berson et al.

(10) Patent No.: US 7,003,668 B2
(45) Date of Patent: Feb. 21, 2006

(54) SECURE AUTHENTICATION OF USERS VIA INTERMEDIATE PARTIES

(75) Inventors: Thomas A. Berson, Palo Alto, CA (US); Stephen M. Rudy, Palo Alto, CA (US)

(73) Assignee: Fusionone, Inc., San Jose, CA (US)

( * ) Notice: Subject to any disclaimer, the term of this patent is extended or adjusted under 35 U.S.C. 154(b) by 561 days.

(21) Appl. No.: 10/003,693

(22) Filed: Nov. 2, 2001

(65) Prior Publication Data
US 2002/0087866 A1      Jul. 4, 2002

Related U.S. Application Data

(60) Provisional application No. 60/245,949, filed on Nov. 3, 2000.

(51) Int. Cl.
*H04L 9/32* (2006.01)

(52) U.S. Cl. .................. 713/182; 713/155; 705/67; 705/72; 726/28; 726/29

(58) Field of Classification Search ............ 713/155, 713/182, 183, 185; 726/28, 29; 705/67, 705/72

See application file for complete search history.

(56) References Cited

U.S. PATENT DOCUMENTS

| 5,418,854 | A | * | 5/1995 | Kaufman et al. ........... 713/156 |
| 5,757,920 | A |   | 5/1998 | Misra et al. .................. 380/25 |
| 5,923,756 | A | * | 7/1999 | Shambroom ................ 713/156 |
| 8,233,565 |   |   | 5/2001 | Lewis et al. ................. 705/35 |

* cited by examiner

*Primary Examiner*—Justin T. Darrow
(74) *Attorney, Agent, or Firm*—Vierra Magen Marcus Harmon & DeNiro

(57) ABSTRACT

An intermediate system provides remote clients with access to a primary system, such as a server. The intermediate system creates and stores a log-in record for each client. The log-in record contains an encrypted primary system client identifier (PSCI). The PSCI contains authentication information for verifying a client's right to access the primary system. Storing an encrypted version of the PSCI enhances the security of the authentication information on the intermediate system. In some implementations of the present invention, the PSCI itself is an encrypted value. When a client attempts to log into the primary system, the intermediate system initially verifies the client's intermediate system access rights. The intermediate system makes this determination using the log-in record and data provided by the client. Next, the intermediate system sends the PSCI to the client's primary system for further authentication. The primary system uses the PSCI to verify the client's right to access primary system data.

43 Claims, 6 Drawing Sheets

SECURE AUTHENTICATION OF USERS VIA INTERMEDIATE PARTIES

CLAIM OF PRIORITY

The present application claims priority to U.S. Provisional Patent Application Ser. No. 60/245,949, entitled "Methods of Secure Authentication of Users Via Intermediate Parties," filed on Nov. 3, 2000.

CROSS-REFERENCE TO RELATED APPLICATION

The present application is related to the following application:

Updating Security Schemes for Remote Client Access, by Bharat Mediratta, Thomas A. Berson, and Stephen M. Rudy, Ser. No. 10/003,027, filed Nov. 2, 2001.

The above-identified application is incorporated herein by reference.

BACKGROUND OF THE INVENTION

1. Field of the Invention

The present invention is directed to the field of securing computer communications.

2. Description of the Related Art

People frequently access data maintained on primary computer systems, such as file servers, from remote client computing devices. Examples of remote client devices include laptop computers, cellular telephones, personal digital assistants ("PDAs"), and personal computers. Intermediate entities facilitate clients' remote access to primary system data. In some instances, intermediate entities provide services for clients that use primary system data. For example, an intermediate entity may provide a data synchronization service—enabling a person to synchronize common data records maintained on both a primary system and a client computing device. Examples of common data records include calendars and address books, which are stored on a primary computer and a PDA. Alternatively, the intermediate entity may provide gateway access without synchronization.

In providing remote access services, intermediate entities strive to ensure that data on primary systems is neither stolen nor destroyed. Authenticating clients' rights to access primary system data plays a critical role. In some instances, intermediate entities control data access by maintaining copies of primary system data and regulating clients' access to the data.

Intermediate entities may regulate data access by maintaining a database of user authentication information, such as passwords, user identifications, and other confidential data used to authenticate a user and provide access to data and services residing on a primary system. When a client attempts to remotely access a primary system through an intermediate entity, the client submits authentication information. The intermediate entity then queries the database of authentication information to verify the client's access rights.

However, maintaining a database of client authentication information at the intermediate entity presents a security drawback. Computer hackers can illegitimately obtain the authentication information from the intermediate entity's computer system. The hackers can then use client passwords to modify, steal, or destroy data from primary systems. Storing a significant amount of primary system data at an intermediate entity also creates an unfavorable condition—intermediate entity computer systems expend considerable resources uploading and storing this data.

SUMMARY OF THE INVENTION

Implementations of the present invention attempt to overcome the drawbacks associated with an intermediate entity storing client authentication information and primary system data.

Clients log into a primary system, such as a file server, through an intermediate entity's computer system, referred to as an intermediate system. The intermediate system creates and stores a log-in record for each client. Each log-in record contains an encrypted primary system client identifier ("PSCI"). The PSCI contains authentication information for verifying a client's right to access a primary system. Storing an encrypted version of the PSCI on the intermediate system significantly impedes computer hackers' ability to steal client authentication information.

In an initial phase of the log-in process, the intermediate system authenticates a client's right to access the intermediate system. In some implementations, the intermediate system employs a client identifier and an encryption key in the initial authentication. The encryption key includes a component provided by the client and unknown to the intermediate system. This eliminates the storage of complete client authentication information on the intermediate system.

After a client's right to access the intermediate system is established, the intermediate system sends the PSCI to the client's primary system for further authentication. In some implementations, the intermediate system sends the PSCI in encrypted form. In alternate embodiments, the intermediate system sends a decrypted version of the PSCI. The primary system uses the PSCI to verify the client's right to access primary system data.

After receiving authentication from the primary system, the client accesses the primary system through the intermediate system—relieving the intermediate system from uploading large amounts of primary system data.

Aspects of the present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

A. Overview

Figure 1:
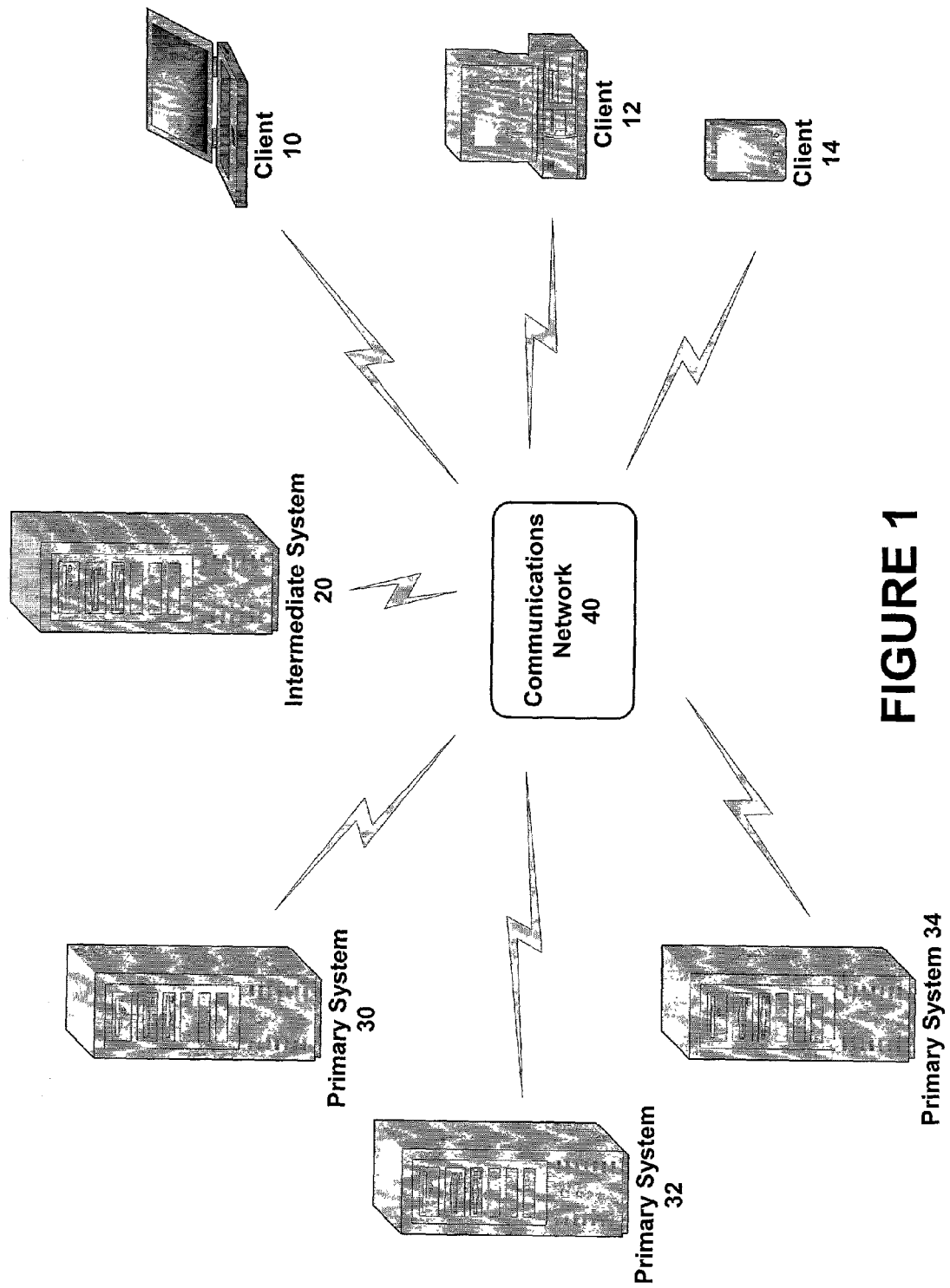
FIG. 1 illustrates a system for providing remote client access to a primary system through an intermediary system in accordance with the present invention.

FIG. 1 depicts a system for providing clients with remote access to primary systems through an intermediate system. Client devices 10, 12, and 14, intermediate system 20, and primary systems 30, 32, and 34 are coupled to communications network 40. In one embodiment, intermediate system 20 communicates with primary systems 30, 32, and 34 over network 40 via a virtual private network. Communications network 40 can be any communications network that enables computing or communications devices to exchange information. Examples of such networks include the Internet, telecommunications networks, intranets, extranets, local area networks, and wide area networks. In an alternate embodiment, intermediate system 20 communicates with primary systems 30, 32, and 34 on one network, and intermediate system 20 communicates with client devices 10, 12, and 14 on another network.

Although client devices 10, 12, and 14 are shown as a laptop computer, personal computer, and personal digital assistant, any computing device can be used as a client device. An additional type of client device that is not shown is a cellular phone. Intermediate system 20 is not limited to the single computer system shown in FIG. 1. In alternate versions of the current invention, intermediate system 20 includes multiple computer systems. This is also true for primary systems 30, 32, and 34.

Figure 2:
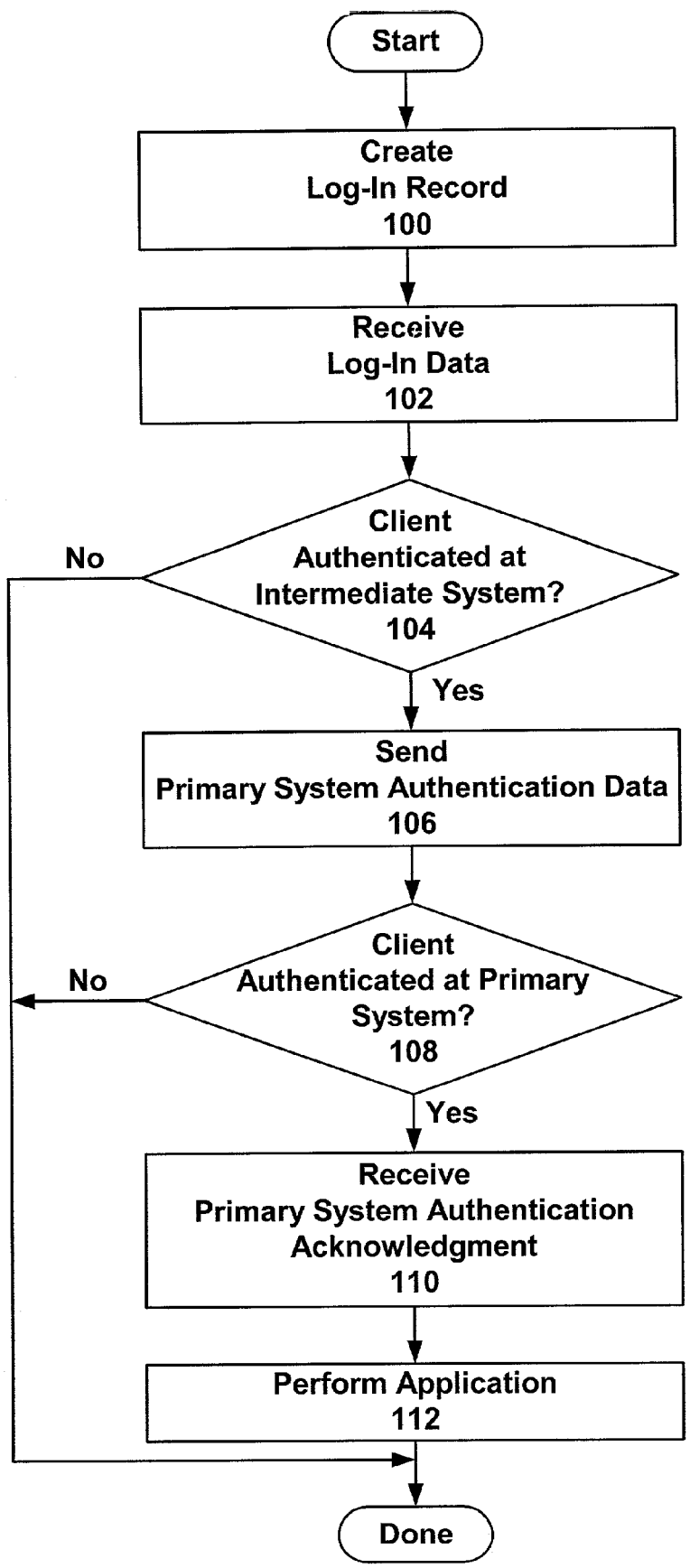
FIG. 2 depicts a process for providing remote client access to a primary system through an intermediate system in accordance with the present invention.

FIG. 2 illustrates process steps for providing a client with remote access to primary systems 30, 32, and 34 through intermediate system 20. In order to communicate with intermediate system 20 and primary systems 30, 32, and 34, clients use computing devices coupled to network 40, such as client devices 10, 12, and 14.

Intermediate system 20 creates log-in records for each client (step 100). Each client receives a separate log-in record for each primary system the client wishes to access. In one version of the present invention, each log-in record includes the following fields: 1) ICID—an intermediate system client identifier that identifies a client; 2) PS—a primary system identifier that identifies a primary system; and 3) E(PSCI)—an encrypted version of the PSCI primary system client identifier described above in the Summary. In alternate embodiments of the present invention, the encrypted version of the PSCI is different, as will be described in detail below. The PS field can be omitted in embodiments of the present invention including only a single primary system. In further embodiments, intermediate system 20 receives pre-encrypted log-in records from primary systems for each client.

When a client attempts to log into a primary system, intermediate system 20 receives log-in data from the client (step 102). In the embodiment shown in FIG. 1, the client sends the log-in data from a client device over network 40. In one implementation, the log-in data includes ICID and PS values, as well as an encryption key component.

Using the log-in data, intermediate system 20 determines whether to authenticate the client for access to intermediate system 20 (step 104). The steps taken to perform this authentication are described in greater detail below for various embodiments of the present invention. If the authentication fails, the log-in process is terminated. If the authentication is successful, intermediate system 20 sends primary system authentication data to the primary system identified in the log-in data (step 106). The primary system authentication data is based on the log-in record's E(PSCI) field and the encryption key component provided by the client. The primary system authentication data varies among different embodiments and is described below in greater.

Employing the primary system authentication data, the primary system determines whether to authenticate the client (step 108). The steps taken to perform this authentication appear below in greater detail for various embodiments of the present invention. If the authentication fails, the log-in process is terminated. If the authentication is successful, intermediate system 20 receives an authentication acknowledgement from the primary system (step 110). After receiving the acknowledgement, intermediate system 20 provides the client with remote access to the identified primary system and services related to the primary system data.

B. First Embodiment: Using A Non-Encrypted PSCI Value

In a first embodiment of the present invention, PSCI is a non-encrypted value containing client identifier CID and client password CPW. Intermediate system 20 decrypts E(PSCI) to obtain the CID and CPW values when authenticating a client's access rights (step 104). Intermediate system 20 then sends the CID and CPW values to a primary system (step 106) for use in authenticating the client (step 108). This embodiment is described in more detail below.

In creating a log-in record for a client (step 100), intermediate system 20 receives PS, CID, and CPW values from the client's primary system. The CID and CPW values combine to form the PSCI. Intermediate system 20 assigns the client an ICID value and an intermediate system client password ("ICP"). In some embodiments, the ICID and/or ICP are submitted by a client prior to their assignment by intermediate system 20. Using the above-identified values, intermediate system 20 generates the log-in record. Intermediate system 20 does not maintain a record of CID, CPW, or ICP.

In the first embodiment, the E(PSCI) value generated for a client's log-in record is expressed in detail as E((tt|CID|CPW), H(IKEY|ICP)), wherein:

E((tt|CID|CPW), H(IKEY|ICP)) is a symmetrically encrypted value with (tt|CID|CPW) being data encrypted using encryption function E. H(IKEY|ICP) is the key for encryption function E. Examples of symmetric encryption functions employed in embodiments of the present invention as function E include the well known DES and AES functions.

| represents concatenation of items adjacent to the | symbol.

tt is a redundant telltale character string used in verifying the accurate decryption of E((tt|CID|CPW), H(IKEY|ICP)).

H(IKEY|ICP) is a hash value resulting from hashing data value (IKEY|ICP) using hash function H. Examples of hash functions employed in embodiments of the present invention as hash function H include the well known MD5 and SHA1 functions.

IKEY is an encryption key component known to intermediate system 20.

ICP is as an encryption key component known to the client and unknown to intermediate system 20.

Those skilled in the art will recognize that concatenated values can be concatenated in different orders in further embodiments of the present invention. Furthermore, additional components can be added to concatenated values in alternative embodiments.

When the client attempts to log into a primary system, intermediate system 20 receives PS, ICID and ICP from the client as the log-in data (step 102, FIG. 2).

Figure 3:
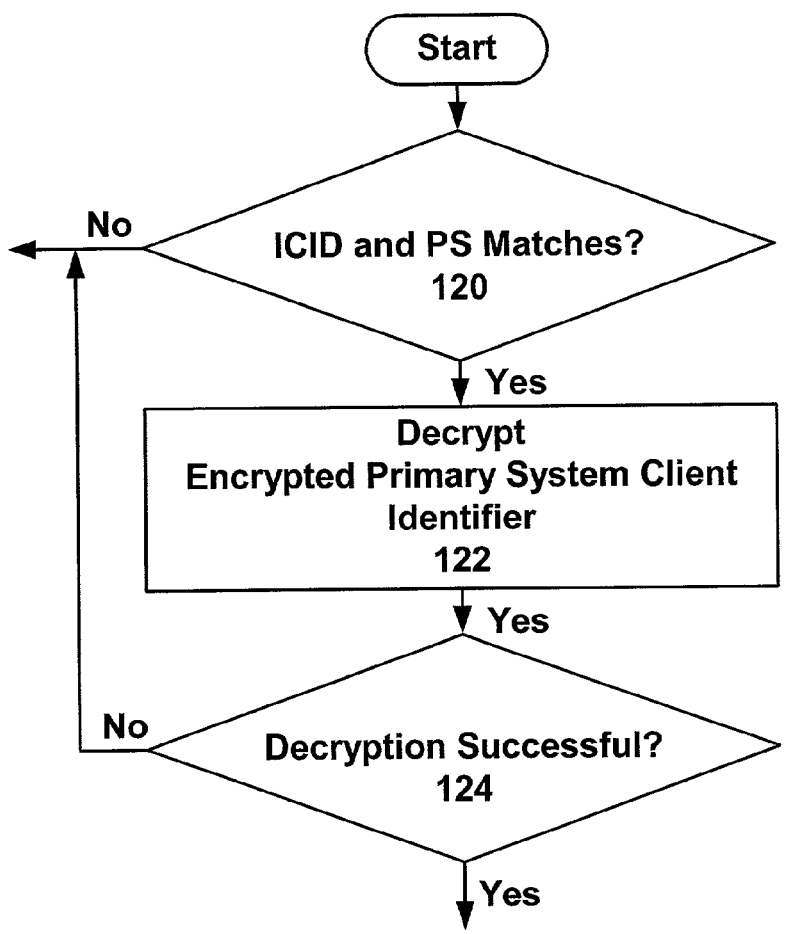
FIG. 3 illustrates a process for an intermediate system to authenticate a client's access rights in one implementation of the present invention.

FIG. 3 illustrates steps performed by intermediate system 20 to carry out the client authentication operation (step 104) shown in FIG. 2. Intermediate system 20 determines whether a client log-in record exists with the combination of the ICID and PS provided by the client (step 120). If the log-in record does not exist, the log-in process is terminated. Otherwise, intermediate system 20 decrypts the E(PSCI) value in the client's log-in record (step 122). In performing the decryption, intermediate system 20 performs hash function H(IKEY|ICP) to obtain a key. Intermediate system 20 then uses this key to decrypt the encrypted E((tt|CID|CPW), H(IKEY|ICP)) value in the client's log-in record.

Intermediate system 20 determines whether the decryption was successful (step 124)—comparing the telltale component of the decryption result with the known tt telltale value described above. If the values do not match, the log-in process is terminated. If the values match, the client's right to access the intermediate system is authenticated. A successful decryption yields CID and CPW, which intermediate system 20 sends to the selected primary system as authentication data (step 106, FIG. 2). Upon receiving CID and CPW, the primary system attempts to authenticate the client's access rights (step 108).

Figure 4:
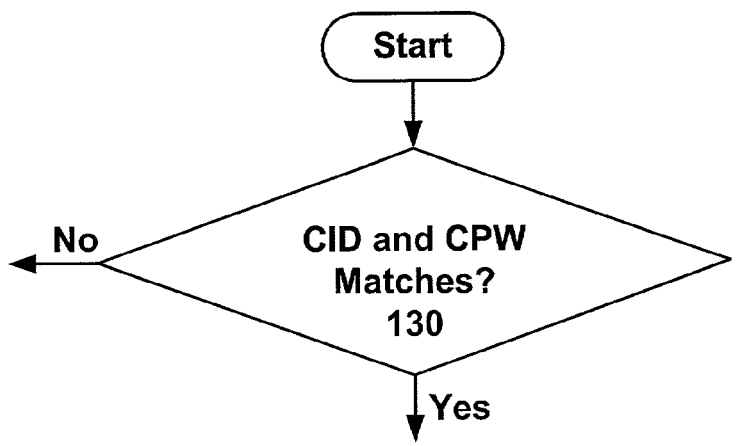
FIG. 4 illustrates a process for a primary system to authenticate a client's access rights in the embodiment of the invention shown in FIG. 3.

FIG. 4 shows the authentication step taken by the primary system to carry out the authentication operation (step 108) shown in FIG. 2. The primary system determines whether CID and CPW correspond to values for a client authorized to access the primary system (step 130). If a match is found, the client is authenticated and an acknowledgement is sent to intermediate system 20 (step 110, FIG. 2). Otherwise, the log-in process is terminated.

C. Second Embodiment: Using A PSCI Value that is Encrypted

In a second embodiment of the present invention, PSCI is an encrypted value. Intermediate system 20 decrypts E(PSCI) when authenticating a client's access rights (step 104). The decryption yields the encrypted PSCI value. Intermediate system 20 then sends the encrypted PSCI value to a primary system (step 106) for use in authenticating the client (step 108). During the authentication, the primary system decrypts PSCI to obtain a CID client identifier and CPW client password. Using an encrypted PSCI value eliminates the transfer of decrypted CID and CPW values by intermediate system 20 on network 40. This embodiment is described in more detail below.

In creating a log-in record for a client (step 100), intermediate system 20 receives PS and PSCI values from the client's primary system. The PSCI value is an encryption of the CID and CPW for the client. In one implementation PSCI is expressed in detail as F((CID|CPW), K), wherein:

F((CID|CPW),K) is an encrypted value with (CID|CPW) being data encrypted using encryption function F and K being the key for encryption function F. In one version of the present invention, encryption function F is symmetric, while in alternate versions encryption function F is asymmetric. Examples of encryption functions employed in embodiments of the present invention as encryption function F include the well known AES and RSA functions.

K is the key used for encryption function F. Encryption key K and a corresponding decryption key for encryption function F are known to the primary system and not known to intermediate system 20.

Intermediate system 20 also assigns ICID and ICP values for the client during creation of the log-in record. Using the PS, PSCI, ICID, and ICP values, intermediate system 20 generates the log-in record. Intermediate system 20 does not maintain a record of PSCI or ICP.

In the second embodiment, the E(PSCI) value generated for a client's log-in record is expressed in detail as E((tt|F((CID|CPW), K)), H(IKEY|ICP)), wherein:

E((tt|F((CID|CPW), K)), H(IKEY|ICP)) is a symmetrically encrypted value with (tt|F((CID|CPW), K)) being data encrypted using encryption function E. H(IKEY|ICP) is the key for encryption function E, as described above for the first embodiment. Examples of symmetric encryption functions employed in embodiments of the present invention as function E include the well known DES and AES functions.

When the client attempts to remotely log into a primary system, intermediate system 20 receives PS, ICID and ICP from the client as the log-in data (step 102, FIG. 2).

Figure 5:
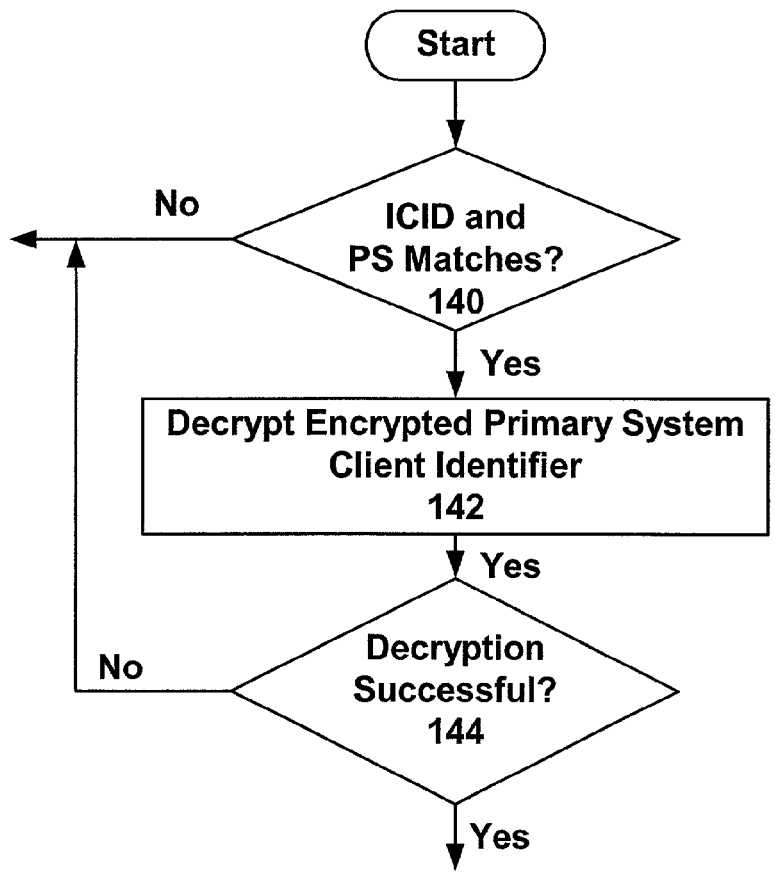
FIG. 5 depicts a process for an intermediate system to authenticate a client's access rights in an alternate implementation of the present invention.

FIG. 5 illustrates steps performed by intermediate system 20 to carry out the client authentication operation (step 104) shown in FIG. 2. Intermediate system 20 determines whether a client log-in record exists with the combination of the ICID and PS provided by the client (step 140). If the log-in record does not exist, the log-in process is terminated. Otherwise, intermediate system 20 decrypts the E(PSCI) value in the client's log-in record (step 142). In performing the decryption, intermediate system 20 performs hash function H(IKEY|ICP) to obtain a key. Intermediate system 20 then uses this key to decrypt the encrypted E((tt|F((CID|CPW), K)), H(IKEY|ICP)) value in the client's log-in record.

Intermediate system 20 then determines whether the decryption was successful (step 144). Intermediate system 20 compares the telltale component of the decryption result with the known tt telltale value described above. If the values do not match, the log-in process is terminated. If the values match, the client's right to access the intermediate party is authenticated. A successful decryption yields PSCI value F((CID|CPW), K). Intermediate system 20 sends the decryption result to the selected primary system (step 106, FIG. 2). Upon receiving the F((CID|CPW), K) value, the primary system attempts to authenticate the client's access rights (step 108).

Figure 6:
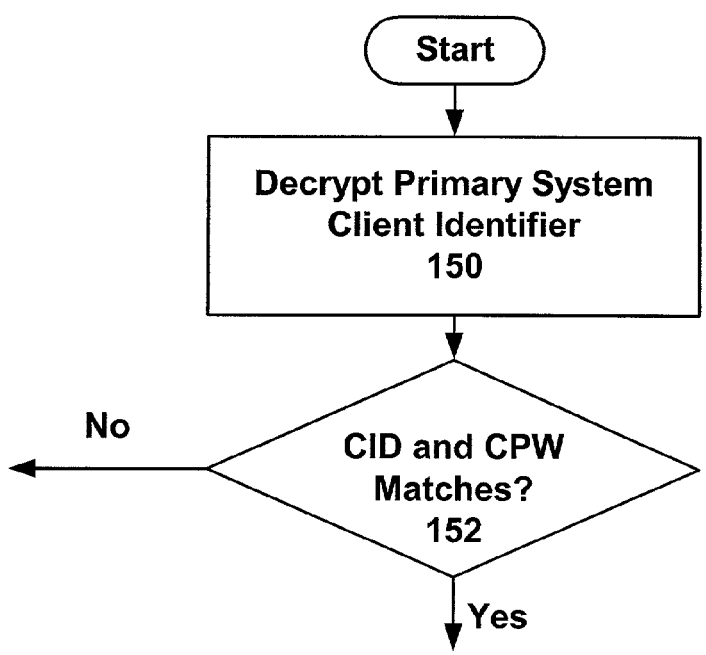
FIG. 6 depicts a process for a primary system to authenticate a client's access rights in the embodiment of the invention shown in FIG. 5.

FIG. 6 shows the authentication steps taken by the primary system to perform the client authentication operation (step 108) shown in FIG. 2. The primary system decrypts the F((CID|CPW), K) value to obtain CID and CPW (step 150). The primary system then determines whether CID and CPW correspond to values for a client authorized to access the primary system (step 152). If a match is found, the client is authenticated and an acknowledgement is sent to intermediate system 20. Otherwise, the log-in process is terminated.

D. Third Embodiment: The Intermediate System is Unable to Verify Decryption of E(PSCI)

In a third embodiment of the present invention, intermediate system 20 cannot verify the decryption of the E(PSCI) field in a client log-in record. Intermediate system 20 authenticates the client's access rights (step 104) —determining whether ICID and PS values supplied by the client correspond to a client log-in record. Intermediate system 20 sends the encrypted E(PSCI) value to a primary system (step 106) for use in authenticating the client (step 108). During the authentication, the primary system decrypts E(PSCI) to obtain a CID client identifier and a CPW client password. Sending the E(PSCI) value to the primary system further reduces the exposure of the PSCI value on network 40. This embodiment is described in more detail below.

In creating a log-in record for a client (step 100), intermediate system 20 receives PS and PSCI values from the client's primary system. The PSCI value is an encryption employing CID and CPW values for the client. In one implementation PSCI is expressed in detail as F((tt|CID|CPW), K), wherein:

F((tt|CID|CPW),K) is an encrypted value with (tt|CID|CPW) being data encrypted using encryption function F and K being the key for encryption function F. In one version of the present invention, encryption function F is symmetric, while in alternate versions encryption function F is asymmetric. Examples of encryption functions employed in embodiments of the present invention as function F include the well known AES and RSA functions.

K is the key used for encryption function F. Encryption key K and a corresponding decryption key for encryption function F are known to the primary system and unknown to intermediate system 20.

tt is a telltale value, as described above. In the third embodiment, however, the tt value is known to the primary system and unknown to intermediate system 20.

Intermediate system 20 also assigns ICID and ICP values for the client during creation of the log-in record. Using the PS, PSCI, ICID, and ICP values, intermediate system 20 generates the log-in record. Intermediate system 20 does not maintain a record of PSCI or ICP.

In the third embodiment, the E(PSCI) value generated for a client's log-in record is expressed in detail as E(F((tt|CID|CPW), K), H(IKEY|ICP)), wherein:

E(F((tt|CID|CPW), K), H(IKEY|ICP)) is a symmetrically encrypted value with (F(tt|CID|CPW), K) being data encrypted using encryption function E. H(IKEY|ICP) is the key for encryption function E as described above for the first embodiment. Examples of symmetric encryption functions employed in embodiments of the present invention as function E include the well known DES and AES functions.

When the client attempts to log into a primary system, intermediate system 20 receives PS, ICID and ICP from the client as the log-in data (step 102, FIG. 2).

Figure 7:
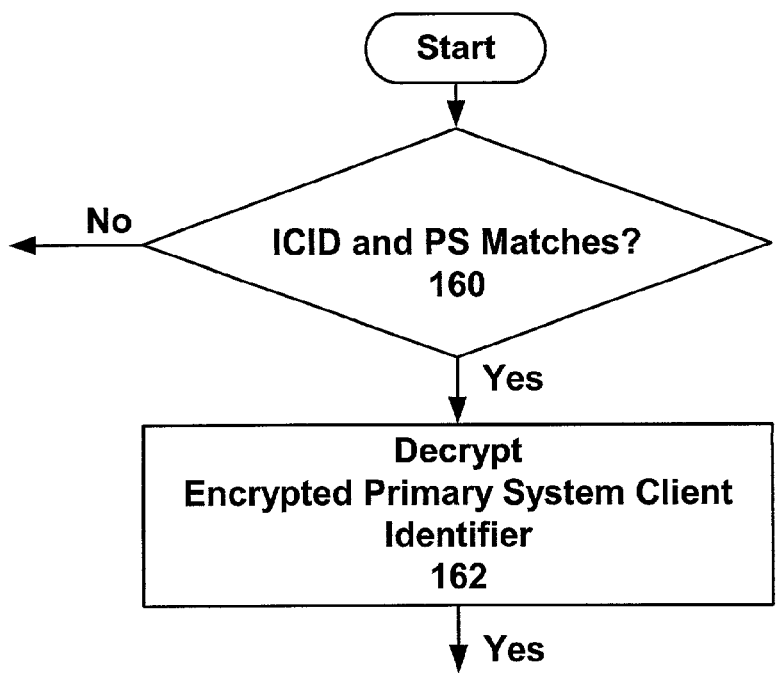
FIG. 7 shows a process for an intermediate system to authenticate a client's access rights in yet another implementation of the present invention.

FIG. 7 illustrates steps performed by intermediate system 20 to carry out the client authentication operation (step 104) shown in FIG. 2. Intermediate system 20 determines whether a client log-in record exists with the combination of the ICID and PS provided by the client (step 160). If the log-in record does not exist, the log-in process is terminated. Otherwise, intermediate system 20 decrypts the log-in record's E(PSCI) value (step 162). In performing the decryption (step 162), intermediate system 20 performs hash function H(IKEY|ICP) to obtain a key. Intermediate system 20 then uses this key to decrypt the E(F((tt|CID|CPW), K), H(IKEY|ICP)) value in the client's log-in record. The decryption yields the F((tt|CID|CPW), K) value.

Unlike the first and second embodiments, intermediate system 20 is unable to determine whether the decryption was successful. Intermediate system 20 does not know the telltale value for measuring the success of the decryption. Intermediate system 20 sends the resulting F((tt|CID|CPW), K) value to the selected primary system (step 106, FIG. 2). Upon receiving the decryption result, the primary system attempts to authenticate the client's access rights (step 108).

Figure 8:
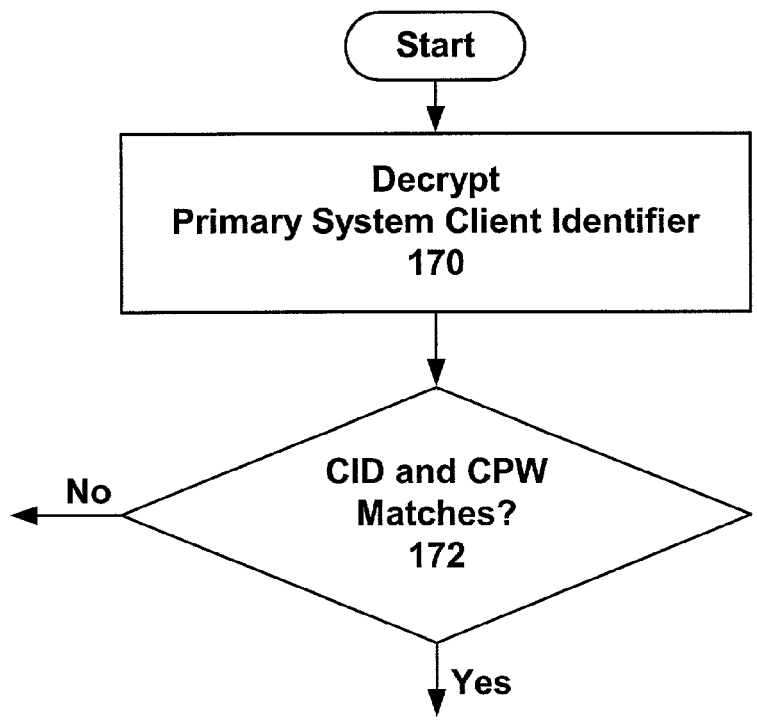
FIG. 8 shows a process for a primary system to authenticate a client's access rights in the embodiment of the present invention shown in FIG. 7.

FIG. 8 shows the authentication steps taken by the primary system to carry out the authentication of the client (step 108) shown in FIG. 2. The primary system decrypts the F((tt|CID|CPW), K) value to obtain CID and CPW (step 170). The primary system then determines whether CID and CPW correspond to values for a client authorized to access the primary system (step 172). If a match is found, the client is authenticated and an acknowledgement is sent to intermediate system 20. Otherwise, the log-in process is terminated.

In determining whether matches exist for CID and CPW in one embodiment, the primary system first ensures the decryption was successful. The primary system accomplishes this by verifying that the decrypted PSCI value has a telltale value that matches the know tt telltale value. In an alternate embodiment, the primary system determines that the decryption was successful by finding a client record with a CID and CPW pair that matches the CID and CPW generated from the decryption.

E. Computer System

Figure 9:
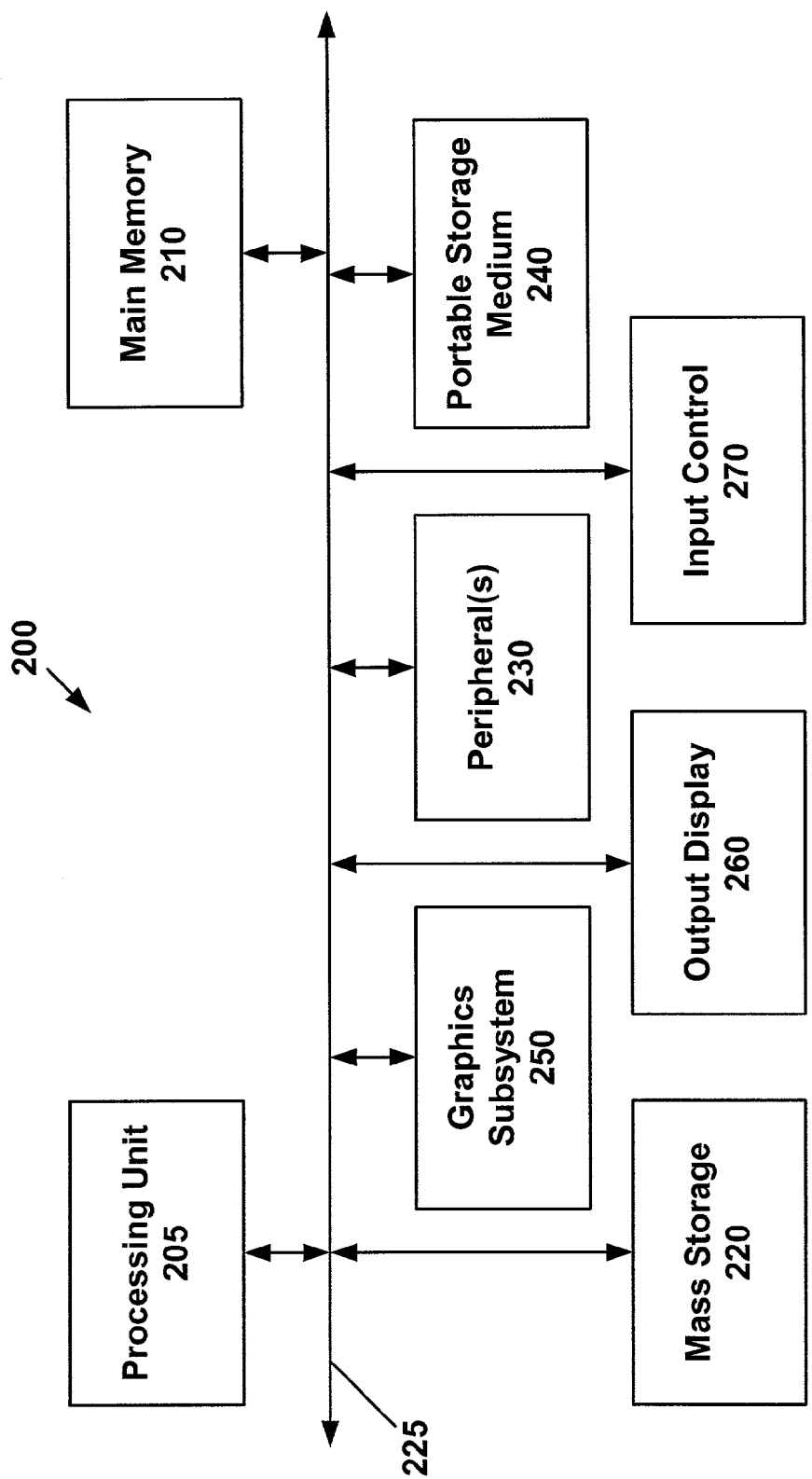
FIG. 9 depicts one embodiment of a computer system that can serve as an intermediate system, primary system, or client device, as shown in FIG. 1.

FIG. 9 illustrates a high level block diagram of general purpose computer system 200. System 200 may be employed in embodiments of the present invention as intermediate system 20. System 200 may also be employed as a primary system (30, 32, and 34) or a client device (10, 12, and 14). Accordingly, computer system 200 may be employed for performing a number of processes, including those illustrated in FIGS. 2–8.

Computer system 200 contains processing unit 205, main memory 210, and interconnect bus 225. Processing unit 205 may contain a single microprocessor or a plurality of microprocessors for configuring computer system 200 as a multiprocessor system. In one embodiment, processing unit 205 includes a specialized cryptographic processor to accelerate the calculation of encryption functions. Processing unit 205 is employed in conjunction with a memory or other data storage medium containing application specific program code instructions to implement either intermediate system 20, a primary system (30, 32, and 34), or a client device (10,12, and 14).

Main memory 210 stores, in part, instructions and data for execution by processing unit 205. If a process, such as the processes illustrated in FIGS. 2–8, is wholly or partially implemented in software, main memory 210 can store the executable instructions for implementing the process when the computer is in operation. For example, main memory 210 can store program code instructions employed by intermediate system 20. In one implementation, main memory 210 includes banks of dynamic random access memory (DRAM) as well as high speed cache memory.

Computer system 200 further include mass storage device 220, peripheral device(s) 230, portable storage medium drive(s) 240, input control device(s) 270, graphics subsystem 250, and output display 260. For purposes of simplicity, all components in computer system 200 are shown in FIG. 9 as being connected via bus 225. However, computer system 200 may be connected through one or more data transport means in alternate implementations. For example, processing unit 205 and main memory 210 may be connected via a local microprocessor bus, and mass storage device 220, peripheral device(s) 230, portable storage medium drive(s) 240, and graphics subsystem 250 may be connected via one or more input/output busses.

Mass storage device 220 is a non-volatile storage device for storing data and instructions for use by processing unit 205. Mass storage device 220 can be implemented in a variety of ways, including a magnetic disk drive or an optical disk drive. In software embodiments of the present invention, mass storage device 220 stores the instructions executed by computer system 200 to perform processes such as those illustrated in FIGS. 2–8.

Portable storage medium drive 240 operates in conjunction with a portable non-volatile storage medium to input and output data and code to and from computer system 200. Examples of such storage mediums include floppy disks, compact disc read only memories (CD-ROM) and integrated circuit non-volatile memory adapters (i.e. PC-MCIA adapter). In one embodiment, the instructions for enabling computer system 200 to execute processes, such as those illustrated in FIGS. 2–8, are stored on such a portable medium, and are input to computer system 200 via portable storage medium drive 240.

Peripheral device(s) 230 may include any type of computer support device, such as an input/output interface, to add additional functionality to computer system 200. For example, peripheral device(s) 230 may include a communications controller, such as a network interface card or integrated circuit, for interfacing computer system 200 to a communications network. Instructions for enabling computer system 200 to perform processes, such as those illustrated in FIGS. 2–8, may be downloaded into the computer system's main memory 210 over a communications network. Computer system 200 may also interface to a database management system over a communications network or other medium that is supported by peripheral device(s) 230.

Input control device(s) 270 provide a portion of the user interface for a user of computer system 200. Input control device(s) 270 may include an alphanumeric keypad for inputting alphanumeric and other key information, a cursor control device, such as a mouse, a trackball, stylus, or cursor direction keys. In order to display textual and graphical information, computer system 200 contains graphics subsystem 250 and output display 260. Output display 260 can include a cathode ray tube display or liquid crystal display. Graphics subsystem 250 receives textual and graphical information, and processes the information for output to output display 260.

The components contained in computer system 200 are those typically found in general purpose computer systems. In fact, these components are intended to represent a broad category of such computer components that are well known in the art.

The process steps and other functions described above with respect to embodiments of the present invention may be implemented as software instructions. More particularly, the process steps illustrated in FIGS. 2–8 may be implemented as software instructions. For one software implementation, the software includes a plurality of computer executable instructions for implementation on a general purpose computer system. Prior to loading into a general purpose computer system, the software instructions may reside as encoded information on a computer readable medium, such as a magnetic floppy disk, magnetic tape, and compact disc read only memory (CD-ROM). In one hardware implementation, circuits may be developed to perform the process steps and other functions described herein.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for providing a client with access to a primary system through an intermediate system, said method comprising the steps of:
    (a) creating a log-in record, wherein said log-in record includes an encrypted version of a primary system client identifier;
    (b) said intermediate system receiving log-in data for said client;
    (c) authenticating access of said client to said intermediate system, based on data from said log-in data and data from said log-in record;
    (d) sending authentication data to said primary system, wherein said authentication data includes data from said primary system client identifier; and
    (e) performing authentication on the primary system using the data from the said primary system client identifier.

2. The method of claim 1, wherein said step (a) includes the step of:
    (1) encrypting said primary system client identifier.

3. The method of claim 1, wherein said step (c) includes the steps of:
    (1) identifying said log-in record as corresponding to said log-in data; and
    (2) decrypting said encrypted version of said primary system client identifier in said log-in record to obtain data for said authentication data.

4. The method of claim 3, wherein said step (c) further includes the step of:
    (3) determining whether said decryption performed in said step (c)(2) is successful.

5. The method of claim 3, wherein said log-in data includes an intermediate system client identifier and a primary system identifier, wherein said step (c)(1) includes the step of:
    (i) identifying said log-in record as containing a first value corresponding to said intermediate system client identifier and a second value corresponding to said primary system identifier.

6. The method of claim 3, wherein said step (c)(2) includes the steps of:
    (i) generating a key for decrypting said encrypted version of said primary system client identifier, wherein said step (c)(2)(i) employs an intermediate system client password from said log-in data; and (ii) employing said key to decrypt said encrypted version of said primary system client identifier.

7. The method of claim 6, wherein said step (c)(2)(i) includes the step of:

hashing a combination of said intermediate system client password and at least one value stored in said intermediate system.

8. The method of claim 1, wherein said encrypted version of said primary system client identifier is expressed as E((tt|CID|CPW), H(IKEY|ICP)), wherein:

E((tt|CID|CPW), H(IKEY|ICP)) is an encrypted value with (tt|CID|CPW) being data encrypted using encryption function E and H(IKEY|ICP) being a key for encryption function E, (CID|CPW) is said primary system client identifier, tt is a redundant telltale character string, H(IKEY|ICP) is a hashed value resulting from hashing data value (IKEY|ICP) with hash function H, IKEY is an encryption key component stored on said intermediate system, ICP is as an encryption key component in said log-in data, CID is a client identifier corresponding to said client, and CPW is a client password corresponding to said client.

9. The method of claim 1, wherein said encrypted version of said primary system client identifier is expressed as E((tt|F((CID|CPW), K)), H(IKEY|ICP)), wherein:

E((tt|F((CID|CPW), K)), H(IKEY|ICP)) is an encrypted value with (tt|F((CID|CPW), K)) being data encrypt using encryption function E and H(IKEY|ICP) being a key for encryption function E, F((CID|CPW),K) is said primary system client identifier, with F((CID|CPW),K) being an encrypted value with (CID|CPW) being data encrypt using encryption function F and K being a key for encryption function F, wherein encryption key K and a corresponding decryption key for encryption function F are known to said primary system and not known to said intermediate system, tt is a redundant telltale character string, H(IKEY|ICP) is a hashed value resulting from hashing data value (IKEY|ICP) with hash function H, IKEY is an encryption key component stored on said intermediate system, ICP is as an encryption key component in said log-in data, CID is a client identifier corresponding to said client, and CPW is a client password corresponding to said client.

10. The method of claim 1, wherein said encrypted version of said primary system client identifier is expressed as E(F((tt|CID|CPW), K), H(IKEY|ICP)), wherein:

E(F((tt|CID|CPW), K), H(IKEY|ICP)) is an encrypted value with (F(tt|CID|CPW), K) being data encrypted using encryption function E and H(IKEY|ICP) being a key for encryption function E, F((tt|CID|CPW),K) is said primary system client identifier, with F((tt|CID|CPW),K) being an encrypted value with (tt|CID|CPW) being data encrypted using encryption function F and K being a key for encryption function F, wherein encryption key K and a corresponding decryption key for encryption function F are known to said primary system and not known to said intermediate system, tt is a redundant telltale character string known to said primary system and not known to said intermediate system, H(IKEY|ICP) is a hashed value resulting from hashing data value (IKEY|ICP) with hash function H, IKEY is an encryption key component stored on said intermediate system, ICP is as an encryption key component in said log-in data, CID is a client identifier corresponding to said client, and CPW is a client password corresponding to said client.

11. The method of claim 1, further including the step of:

(e) said primary system authenticating access of said client to said primary system, based on said authentication data sent to said primary system in said step (e).

12. The method of claim 11, wherein said step (e) includes the step of:

(1) said primary system determining whether at least one value from said authentication data corresponds to said client.

13. The method of claim 12, wherein said authentication data includes a client identifier and a client password, wherein said step (c)(1) includes the step of:

(i) verifying said client identifier and said client password correspond to said client.

14. The method of claim 11, wherein said step (e) includes the steps of:

(1) decrypting said authentication data to obtain a set of data; and (2) determining whether at least one value from said set of data corresponds to said client.

15. The method of claim 14, wherein said set of data includes a client identifier and a client password, wherein said step (e)(2) includes the step of:

(i) verifying said client identifier and said client password correspond to said client.

16. The method of claim 14, wherein said authentication data is said primary system client identifier.

17. The method of claim 16, wherein said primary system client identifier is expressed as F((CID|CPW),K), wherein:

F((CID|CPW),K) is an encrypted value with (CID|CPW) being data encrypt using encryption function F and K being a key for encryption function F, wherein encryption key K and a corresponding decryption key for encryption function F are known to said primary system and not known to said intermediate system, CID is a client identifier corresponding to said client, and CPW is a client password corresponding to said client.

18. The method of claim 16, wherein said primary system client identifier is expressed as F((tt|CID|CPW),K), wherein:

F((tt|CID|CPW),K) is an encrypted value with (tt|CID|CPW) being data encrypted using encryption function F and K being a key for encryption function F, wherein encryption key K and a corresponding decryption key for encryption function F are known to said primary system and not known to said intermediate system, tt is a redundant telltale character string known to said primary system and not known to said intermediate system, CID is a client identifier corresponding to said client, and CPW is a client password corresponding to said client.

19. A processor readable storage medium having processor readable code embodied on said processor readable storage medium, said processor readable code for programming a processor to perform a method for providing a client with access to a primary system through an intermediate system, said method comprising the steps of:

(a) creating a log-in record, wherein said log-in record includes an encrypted version of a primary system client identifier;

(b) said intermediate system receiving log-in data for said client;

(c) authenticating access of said client to said intermediate system, based on data from said log-in data and data from said log-in record;

(d) sending authentication data to said primary system, wherein said authentication data includes data from said primary system client identifier; and (e) performing authentication on the primary system using the data from the said primary system client identifier.

20. The processor readable storage medium of claim 19, wherein said step (a) includes the step of:

(1) encrypting said primary system client identifier.

21. The processor readable storage medium of claim 19, wherein said step (c) includes the steps of:

(1) identifying said log-in record as corresponding to said log-in data; and (2) decrypting said encrypted version of said primary system client identifier in said log-in record to obtain data for said authentication data.

22. The processor readable storage medium of claim 21, wherein said log-in data includes an intermediate system client identifier and a primary system identifier, wherein said step (c)(1) includes the step of:

(i) identifying said log-in record as containing a first value corresponding to said intermediate system client identifier and a second value corresponding to said primary system identifier.

23. The processor readable storage medium of claim 21, wherein said step (c)(2) includes the steps of:

(i) generating a key for decrypting said encrypted version of said primary system client identifier, wherein said step (c)(2)(i) employs an intermediate system client password from said log-in data; and (ii) employing said key to decrypt said encrypted version of said primary system client identifier.

24. The processor readable storage medium of claim 23, wherein said step (c)(2)(i) includes the step of:

hashing a combination of said intermediate system client password and at least one value stored in said intermediate system.

25. The processor readable storage medium of claim 19, wherein said encrypted version of said primary system client identifier is expressed as E((tt|CID|CPW), H(IKEY|ICP)), wherein:

E((tt|CID|CPW), H(IKEY|ICP)) is an encrypted value with (tt|CID|CPW) being data encrypted using encryption function E and H(IKEY|ICP) being a key for encryption function E, (CID|CPW) is said primary system client identifier, tt is a redundant telltale character string, H(IKEY|ICP) is a hashed value resulting from hashing data value (IKEY|ICP) with hash function H, IKEY is an encryption key component stored on said intermediate system, ICP is as an encryption key component in said log-in data, CID is a client identifier corresponding to said client, and CPW is a client password corresponding to said client.

26. The processor readable storage medium of claim 19, wherein said encrypted version of said primary system client identifier is expressed as E((tt|F((CID|CPW), K)), H(IKEY|ICP)), wherein:

E((tt|F((CID|CPW), K)), H(IKEY|ICP)) is an encrypted value with (tt|F((CID|CPW), K)) being data encrypt using encryption function E and H(IKEY|ICP) being a key for encryption function E, F((CID|CPW),K) is said primary system client identifier, with F((CID|CPW),K) being an encrypted value with (CID|CPW) being data encrypt using encryption function F and K being a key for encryption function F, wherein encryption key K and a corresponding decryption key for encryption function F are known to said primary system and not known to said intermediate system, tt is a redundant telltale character string, H(IKEY|ICP) is a hashed value resulting from hashing data value (IKEY|ICP) with hash function H, IKEY is an encryption key component stored on said intermediate system, ICP is as an encryption key component in said log-in data, CID is a client identifier corresponding to said client, and CPW is a client password corresponding to said client.

27. The processor readable storage medium of claim 19, wherein said encrypted version of said primary system client identifier is expressed as E(F((tt|CID|CPW), K), H(IKEY|ICP)), wherein:

E(F((tt|CID|CPW), K), H(IKEY|ICP)) is an encrypted value with (F(tt|CID|CPW), K) being data encrypted using encryption function E and H(IKEY|ICP) being a key for encryption function E, F((tt|CID|CPW),K) is said primary system client identifier, with F((tt|CID|CPW),K) being an encrypted value with (tt|CID|CPW) being data encrypted using encryption function F and K being a key for encryption function F, wherein encryption key K and a corresponding decryption key for encryption function F are known to said primary system and not known to said intermediate system, tt is a redundant telltale character string known to said primary system and not known to said intermediate system, H(IKEY|ICP) is a hashed value resulting from hashing data value (IKEY|ICP) with hash function H, IKEY is an encryption key component stored on said intermediate system, ICP is as an encryption key component in said log-in data, CID is a client identifier corresponding to said client, and CPW is a client password corresponding to said client.

28. The processor readable storage medium of claim 19, further including the step of:

(e) said primary system authenticating access of said client to said primary system, based on said authentication data sent to said primary system in said step (e).

29. The processor readable storage medium of claim 28, wherein said step (e) includes the step of:

(1) said primary system determining whether at least one value from said authentication data corresponds to said client.

30. The processor readable storage medium of claim 29, wherein said authentication data includes a client identifier and a client password, wherein said step (c)(1) includes the step of:

(i) verifying said client identifier and said client password correspond to said client.

31. The processor readable storage medium of claim 28, wherein said step (e) includes the steps of:

(1) decrypting said authentication data to obtain a set of data; and (2) determining whether at least one value from said set of data corresponds to said client.

32. The processor readable storage medium of claim 31, wherein said set of data includes a client identifier and a client password, wherein said step (e)(2) includes the step of:
- (i) verifying said client identifier and said client password correspond to said client.

33. The processor readable storage medium of claim 31, wherein said authentication data is said primary system client identifier.

34. The processor readable storage medium of claim 33, wherein said primary system client identifier is expressed as F((CID|CPW),K), wherein:
- F((CID|CPW),K) is an encrypted value with (CID|CPW) being data encrypt using encryption function F and K being a key for encryption function F, wherein encryption key K and a corresponding decryption key for encryption function F are known to said primary system and not known to said intermediate system,
- CID is a client identifier corresponding to said client, and
- CPW is a client password corresponding to said client.

35. The processor readable storage medium of claim 33, wherein said primary system client identifier is expressed as F((tt|CID|CPW),K), wherein:
- F((tt|CID|CPW),K) is an encrypted value with (tt|CID|CPW) being data encrypted using encryption function F and K being a key for encryption function F, wherein encryption key K and a corresponding decryption key for encryption function F are known to said primary system and not known to said intermediate system,
- tt is a redundant telltale character string known to said primary system and not known to said intermediate system,
- CID is a client identifier corresponding to said client, and
- CPW is a client password corresponding to said client.

36. An apparatus providing a client with access to a primary system through an intermediate system, said apparatus comprising:
- a processor; and
- a processor readable storage medium, in communication with said processor, said processor readable storage medium storing code for programming said processor to perform a method including the steps of:
  - (a) creating a log-in record, wherein said log-in record includes an encrypted version of a primary system client identifier;
  - (b) said intermediate system receiving log-in data for said client;
  - (c) authenticating access of said client to said intermediate system, based on data from said log-in data and data from said log-in record;
  - (d) sending authentication data to said primary system, wherein said authentication data includes data from said primary system client identifier; and
  - (e) performing authentication on the primary system using the data from the said primary system client identifier.

37. The apparatus of claim 36, wherein said step (a) includes the step of:
- (1) encrypting said primary system client identifier.

38. The apparatus of claim 36, wherein said step (c) includes the steps of:
- (1) identifying said log-in record as corresponding to said log-in data; and
- (2) decrypting said encrypted version of said primary system client identifier in said log-in record to obtain data for said authentication data.

39. The apparatus of claim 38, wherein said step (c)(2) includes the steps of:
- (i) generating a key for decrypting said encrypted version of said primary system client identifier, wherein said step (c)(2)(i) employs an intermediate system client password from said log-in data; and
- (ii) employing said key to decrypt said encrypted version of said primary system client identifier.

40. The apparatus of claim 39, wherein said step (c)(2)(i) includes the step of:
- hashing a combination of said intermediate system client password and at least one value stored in said intermediate system.

41. The apparatus of claim 36, wherein said encrypted version of said primary system client identifier is expressed as E((tt|CID|CPW), H(IKEY|ICP)), wherein:
- E((tt|CID|CPW), H(IKEY|ICP)) is an encrypted value with (tt|CID|CPW) being data encrypted using encryption function E and H(IKEY|ICP) being a key for encryption function E,
- (CID|CPW) is said primary system client identifier,
- tt is a redundant telltale character string,
- H(IKEY|ICP) is a hashed value resulting from hashing data value (IKEY|ICP) with hash function H,
- IKEY is an encryption key component stored on said intermediate system,
- ICP is as an encryption key component in said log-in data,
- CID is a client identifier corresponding to said client, and
- CPW is a client password corresponding to said client.

42. The apparatus of claim 36, wherein said encrypted version of said primary system client identifier is expressed as E((tt|F((CID|CPW), K)), H(IKEY|ICP)), wherein:
- E((tt|F((CID|CPW), K)), H(IKEY|ICP)) is an encrypted value with (tt|F((CID|CPW), K)) being data encrypt using encryption function E and H(IKEY|ICP) being a key for encryption function E,
- F((CID|CPW),K) is said primary system client identifier, with F((CID|CPW),K) being an encrypted value with (CID|CPW) being data encrypt using encryption function F and K being a key for encryption function F, wherein encryption key K and a corresponding decryption key for encryption function F are known to said primary system and not known to said intermediate system,
- tt is a redundant telltale character string,
- H(IKEY|ICP) is a hashed value resulting from hashing data value (IKEY|ICP) with hash function H,
- IKEY is an encryption key component stored on said intermediate system,
- ICP is as an encryption key component in said log-in data,
- CID is a client identifier corresponding to said client, and
- CPW is a client password corresponding to said client.

43. The apparatus of claim 36, wherein said encrypted version of said primary system client identifier is expressed as E(F((tt|CID|CPW), K), H(IKEY|ICP)), wherein:
- E(F((tt|CID|CPW), K), H(IKEY|ICP)) is an encrypted value with (F(tt|CID|CPW), K) being data encrypted using encryption function E and H(IKEY|ICP) being a key for encryption function E,
- F((tt|CID|CPW),K) is said primary system client identifier, with F((tt|CID|CPW),K) being an encrypted value with (tt|CID|CPW) being data encrypted using encryption function F and K being a key for encryption function F, wherein encryption key K and a corresponding decryption key for encryption function F are known to said primary system and not known to said intermediate system, tt is a redundant telltale character string known to said primary system and not known to said intermediate system, H(IKEY|ICP) is a hashed value resulting from hashing data value (IKEY|ICP) with hash function H, IKEY is an encryption key component stored on said intermediate system, ICP is as an encryption key component in said log-in data, CID is a client identifier corresponding to said client, and CPW is a client password corresponding to said client.

* * * * *